ic Office 2,742,498
Patented Apr. 17, 1956

2,742,498

AMIDIC ACIDS

Herschel G. Smith, Wallingford, Troy L. Cantrell, Drexel Hill, and John G. Peters, Audubon, Pa., assignors to Gulf Oil Corporation, Pittsburgh, Pa., a corporation of Pennsylvania No Drawing. Application October 2, 1952, Serial No. 312,843

10 Claims. (Cl. 260—518)

This invention relates to new chemical compounds and processes for the preparation of the same. More particularly, this invention relates to amidic acids and salts thereof suitable as additives for various mineral oils and coating compositions.

One object of this invention is to provide a new class of amidic acids and salts not known heretofore. Another object of this invention is to provide a novel class of compounds possessing advantageous characteristics and valuable industrial uses. Other objects are apparent from the accompanying description.

These and other objects of the invention are achieved by the provision of the following class of novel compounds, having the formula:

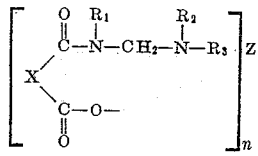

wherein

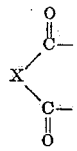

represents the acyl residue of a dicarboxylic acid capable of forming a cyclic acid anhydride, $R_1$ and $R_2$ represent acyclic aliphatic radicals having at least eight carbon atoms, or cycloalkyl, aryl, alkaryl and aralkyl radicals, $R_3$ is hydrogen or a radical of the type of $R_1$ and $R_2$, Z is hydrogen or a salt-forming radical, and $n$ is an integer equal to the valence of Z.

The novel class of compounds of our invention are in effect amidic acids or salts thereof and are derived from the reaction of a cyclic, dicarboxylic acid anhydride with methylene diamines having the formula

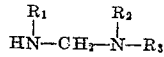

wherein $R_1$, $R_2$ and $R_3$ are as defined hereinabove.

These methylene diamines in turn are conveniently obtained by condensing the appropriate amines with formaldehyde. Of the amines which are employed in order to form the methylene diamine by formaldehyde condensation, the primary amines are preferred. However, secondary amines also produce desirable compounds, but with respect thereto, an obvious limitation exists. Since there must be an available N-hydrogen atom in the methylene diamine in order to form the amidic acids of our invention, at least one of the two amines condensed by means of formaldehyde must be a primary amine. The other amine can be either a primary or a secondary amine. Accordingly, either primary amines or equimolar mixtures of primary and secondary amines are suitable for condensation with formaldehyde to form the methylene diamines.

As is evident from the generic formula set forth hereinabove, a number of different classes of amines, both primary and secondary, are useful in the preparation of the methylene diamines. These classes are alkyl, alkenyl, cycloalkyl, aryl, alkaryl and aralkyl amines.

Illustrative of the primary, acyclic aliphatic amines are the alkyl amines having at least 8 carbon atoms, preferably from 8 to 26 carbon atoms, such as octyl, nonyl, decyl, undecyl, dodecyl, tetradecyl, hexadecyl, octadecyl and eicosyl amines. The corresponding alkenyl amines such as octenyl, nonenyl, undecenyl, tetradecenyl, hexadecenyl, octadecenyl (oleyl) and eicosenyl amines are also suitable. Primary alkyl or alkenyl amines having more than 26 carbon atoms, such as wax amines, are also suitable. Examples of suitable primary cycloalkyl amines include cyclopentyl, cyclohexyl, cycloheptyl amines and the like. Aniline, alphanaphthylamine and betanaphthylamine are illustrative of suitable aryl amines, just as toluidines and xylidines are illustrative of suitable alkaryl amines. Satisfactory aralkyl amines are exemplified by benzylamine, betaphenylethylamine and the like.

Secondary amines corresponding to all these classes of amines also produce advantageous compounds. These include not only amines containing substituents from the same class, such as diphenylamine, phenylalphanaphthylamine and dicyclohexylamine, but also amines containing substituents from different classes such as octyl-phenyl amine and the like. Other suitable secondary amines are N,N-oleyl propanolamine and N,N-dodecylethanol amine.

In the class of primary alkyl amines, the use of commercial mixtures of fatty amines is preferred. One commercially available mixture of amines is the so-called "cocoamine" which is prepared by converting the mixed acids of coconut oil into the corresponding amines by well known methods. The commercial cocoamine has an average molecular weight of about 200–210 and contains a major proportion of lauryl amine with minor proportions of the homologues thereof. By "coco radical" as used herein is meant the mixture of coconut oil fatty acid alkyl groups present as N-substituents in commercial cocoamine.

The condensation of the amines with formaldehyde to form the methylene diamines takes place satisfactorily at mildly elevated temperature of about 160° F. Somewhat higher or lower temperatures may be used. The mol ratio of amines to formaldehyde for this reaction is 2:1. When the condensation reaction is complete and all of the formaldehyde has combined, the temperature is raised to 260° F. to dehydrate the product. Higher temperatures, up to about 400° F., may be utilized to advantage in order to minimize the time required for dehydration. Temperatures materially in excess of 400° F. are undesirable, since they may result in the formation of color-forming bodies and in some decomposition of products.

The novel amidic acids of our invention are prepared conveniently by reacting a cyclic, dicarboxylic acid anhydride with the above described methylene diamines. Any cyclic dicarboxylic acid anhydride is suitable for the purposes of the invention, since these substances, as known in the art, are capable of reacting with primary or secondary amines to form amides.

Aliphatic dicarboxylic acids which are capable of forming cyclic acid anhydrides are those having two carboxyl groups attached to adjacent carbon atoms or to carbon atoms separated by a third carbon atom. Examples of such acids are maleic, succinic, and glutaric acids. Alkyl substitution products of these acids, such as isopropyl succinic acid (pimelic acid) behave similarly as the unsubstituted acids. Aromatic dicarboxylic acid anhydrides, such as the anhydride of o-phthalic acid, are also suitable for the purposes of the invention.

Cyclic dicarboxylic acid anhydrides are utilized, since they react with the methylene diamines described to form amidic acids at relatively moderate temperatures. Accordingly, the reaction takes place with minimum decomposition and polymerization, thereby avoiding formation of color-forming materials. In addition, compounds prepared from the acidic anhydrides of dicarboxylic acids generally are characterized by greater oil solubility.

The reaction of the acid anhydrides with the described methylene diamines takes place satisfactorily at temperatures of about 200° F. Higher or lower temperatures may be used, however. Normally, the reaction is complete or substantially complete after about 60 to about 120 minutes, depending largely on the temperature employed. The acid anhydride and methylene diamine are reacted in equimolar proportions.

It is preferred to conduct the reaction in a solvent medium such as a lubricating oil, light naphtha or the like, particularly when a metal salt of the resulting amidic acid is to be prepared. In preparing metal salts of the amidic acids, it is not necessary to prepare the amidic acid separately, but the methylene diamine, the dicarboxylic acid anhydride, and a suitable metal hydroxide can all be reacted together simultaneously. Thus, the alkali metal hydroxides and the alkaline earth metal hydroxides can be added directly to the reacting mass in the form of an aqueous solution or slurry. In the case of certain difficultly reacting metal hydroxides, the alkali metal salt of the amidic acid can be prepared as described above, and the amidic acid salt of the desired metal can be obtained by metathesis of such alkali metal salt and a water soluble salt of the desired metal. Illustrative of metals which provide desirable amidic acid salts according to this invention are sodium, lithium, potassium, barium, calcium, magnesium, strontium, lead, copper, iron, nickel, mercury, zinc, bismuth, aluminum, chromium, tin, manganese, silver and cadmium.

Amine or ammonium salts of the novel amidic acids are also included in the invention. These can be prepared, for example, by simple reaction of the amidic acid with an appropriate nitrogen base, such as a primary, secondary, or tertiary amine, or ammonium hydroxide.

The neutralization of the amidic acids proceeds easily at room temperature or moderately elevated temperatures.

The novel compounds of the invention are mineral oil-soluble, and vary from generally-light colored liquids or low-melting solids to solids or liquids of somewhat darker color.

The following examples are illustrative of methods of preparing the compounds disclosed herein. It is understood that variations in the specifically disclosed proportions of ingredients, times of reaction, order of steps, and temperatures may be resorted to when desirable. Other acid anhydrides and amines than those disclosed in the examples, as disclosed hereinabove, can be substituted for the amines shown.

*Example I*

Four mols of cocamine were introduced into a reaction vessel. Two mols of formaldehyde (in a 37 per cent by weight aqueous solution) were slowly added with constant stirring, while maintaining the temperature below about 160° F. When the reaction was complete, after about 60 minutes, the temperature was raised to 350° F. to remove all water, both that added with the formaldehyde and that formed in the reaction. The methylene diamine product so formed and one mol of calcium hydroxide were then dispersed in an equal weight of lubricating oil. Two mols of phthalic anhydride, the acid anhydride of o-phthalic acid, were then added and the temperature held at 200° F. for two hours. The temperature was subsequently raised to 270° F. to dry the product and the product was filtered. The mineral oil solution of the product formed by this process had the following properties:

| | |
|---|---|
| Sp. Gr., 60°/60° F. | 0.8969 |
| Viscosity, SUV 100° F. | 279 |
| Color, NPA | 1.75 |
| Neutralization No. | 1.74 |
| Ash: Per cent | 1.6 |
| pH Value | 9.9 |

The salt formed in this example had the following formula:

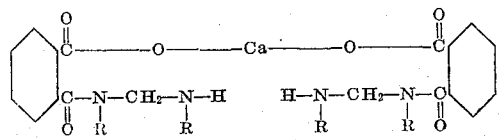

where "R" represents the "coco" radical or residue of the cocoamine.

The salt formed as described above except using a volatile solvent instead of a lubricating oil solvent, exhibited the following characteristics after removal of solvent:

| | |
|---|---|
| Characteristics | clear solid |
| Molecular weight | 1200 |
| Ash: Per cent by wt. | 4.66 |

*Example II*

The salt described in Example I was also formed by metathesis. According to this method, four mols of cocoamine were introduced into a reaction vessel, and 2 mols of formaldeyhde in a 37 per cent by weight aqueous solution were slowly added with constant stirring, while maintaining the temperature below 160° F. When the reaction was completed, after about 60 minutes, the temperature was raised to 350° F. to remove all water, both that added with the formaldehyde and that formed with the reaction. The methylene diamine product so formed was dispersed in an equal weight of lubricating oil and 2 mols of a 40 per cent aqueous solution of sodium hydroxide were added. Two mols of phthalic anhydride were added and the temperature held at 200° F. for two hours. Then 1 mol of an aqueous solution of calcium chloride was added continuing agitation for two hours. The temperature was subsqeuently raised to 270° F. to dry, and the product was filtered to remove the salts and extraneous material. The mineral oil solution of the product formed by this process had the following properties:

| | |
|---|---|
| Sp. Gr., 60°/60° F. | 0.8969 |
| Viscosity, SUV 100° F. | 279 |
| Color, NPA | 1.75 |
| Neutralization No. | 1.74 |
| Ash: Per cent | 1.6 |
| pH Value | 9.9 |

*Example III*

In an open enamel lined reaction vessel, 1260 parts by weight of cocoamine and 255 parts by weight of a 37 per cent by weight aqueous formaldehyde solution were reacted for about 60 minutes, while maintaining a temperature below about 160° F. The temperature was then raised to 300° F. in order to remove the water which was formed and which was added with the formaldehyde. The mixture was subsequently cooled to 180° F. and 444 parts by weight of phthalic anhydride were added. The reaction was allowed to proceed for half an hour at 200° F. The product obtained had the following properties:

Characteristics _ _ _ _ _ _ _ _ _ _ _ _ _ _ _ clear, low-melting solid
Molecular weight _ _ _ _ _ _ _ _ _ _ _ _ _ _ _ _ _ _ _ _ _ _ _ _ 580
Neutralization No _ _ _ _ _ _ _ _ _ _ _ _ _ _ _ _ _ _ _ _ _ _ _ 96.8
Gravity: °API _ _ _ _ _ _ _ _ _ _ _ _ _ _ _ _ _ _ _ _ _ _ _ _ _ 15.7
Viscosity, SUV 210° F _ _ _ _ _ _ _ _ _ _ _ _ _ _ _ _ _ _ _ _ 107.4
Color, NPA _ _ _ _ _ _ _ _ _ _ _ _ _ _ _ _ _ _ _ _ _ _ _ _ _ _ _ 3.0

The amidic acid formed in this example had the following formula:

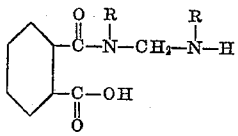

where "R" represents the "coco" radical or residue of the cocoamine.

Example IV

In an enamel lined reaction vessel, 1260 parts by weight of cocoamine and 255 parts by weight of a 37 per cent by weight aqueous formaldehyde solution were reacted for about 60 minutes, while maintaining a temperature below about 160° F. The temperature was then raised to 300° F. in order to remove the water of reaction and that in which the formaldehyde had been dissolved. The mixture was subsequently cooled to 180° F. and 294 parts by weight of maleic anhydride were added. The temperature was held at 160–200° F. until completion of the reaction, i. e., about 90 minutes. The product had the following properties:

Characteristics _ _ _ _ _ _ _ _ _ _ _ _ _ _ _ _ _ _ _ dark-colored liquid
Molecular weight _ _ _ _ _ _ _ _ _ _ _ _ _ _ _ _ _ _ _ _ _ _ _ 530
Neutralization No _ _ _ _ _ _ _ _ _ _ _ _ _ _ _ _ _ _ _ _ _ _ 105.8
Gravity: °API _ _ _ _ _ _ _ _ _ _ _ _ _ _ _ _ _ _ _ _ _ _ _ _ 20.9
Viscosity, SUV 210° F _ _ _ _ _ _ _ _ _ _ _ _ _ _ _ _ _ _ _ _ 80.2
Color, NPA _ _ _ _ _ _ _ _ _ _ _ _ _ _ _ _ _ _ _ _ _ _ _ _ _ _ 3.0

The amidic acid formed in this example had the formula:

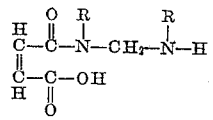

where "R" represents the "coco" radical or residue of the cocoamine.

Example V

Into an enamel lined reaction vessel, 4 mols of dicyclohexylamine and 4 mols of a 37 per cent aqueous solution of formaldehyde were introduced. The mixture was reacted for 15 minutes at a temperature of 160° F. and then 4 mols of cocoamine were added. This reaction was allowed to proceed for one hour at a temperature of 184° F. Subsequently, in order to remove water, the temperature was raised to 300° F. The mixture was then cooled to 180° F. and 4 mols of phthalic anhydride were added. The mixture was then heated to 250° F., until the product became clear. The product had the following properties:

Characteristics: clear colored, low-melting solid of fat-like consistency

Molecular weight _ _ _ _ _ _ _ _ _ _ _ _ _ _ _ _ _ _ _ _ _ _ _ 551
Neutralization No _ _ _ _ _ _ _ _ _ _ _ _ _ _ _ _ _ _ _ _ _ _ 101.7
Gravity: °API _ _ _ _ _ _ _ _ _ _ _ _ _ _ _ _ _ _ _ _ _ _ _ _ 15.8
Color, NPA _ _ _ _ _ _ _ _ _ _ _ _ _ _ _ _ _ _ _ _ _ _ _ _ _ _ 7.5

The amidic acid formed in this example had the formula:

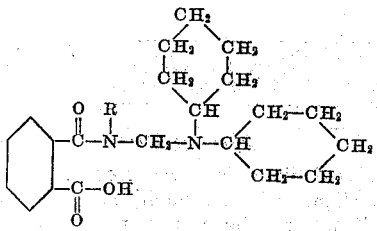

where "R" represents the "coco" radical or residue of the cocoamine.

As will be obvious to one skilled in the art, any of the primary amines or mixtures of primary and secondary amines described also can be utilized to form the methylene diamines according to the procedure described in Examples I–V inclusive. Also, any of the previously described class of acid anhydrides can be substituted in the above example with satisfactory results.

The amidic acids and salts of this invention are useful in many arts, particularly those where corrosion and rust inhibiting properties are desired. Their solubility in oil permits their use in lubricating oils where it is desirable to inhibit rust and corrosion. Moreover, these compounds produce excellent results when used in lubricating oils which encounter severe operating conditions. The effectiveness of our new compounds as mineral oil additives is clearly illustrated by the following examples.

Example VI

A turbine lubricating oil was treated with 0.3 per cent by weight of the product prepared according to Example I above. Comparison tests of the untreated oil and the treated oil were as follows:

| | Untreated Oil | Treated Oil |
| --- | --- | --- |
| Gravity, °API | 29.0 | 28.9 |
| Viscosity, SUV: | | |
| 100° F | 407 | 407 |
| 130° F | 192.7 | 190.6 |
| 210° F | 60.0 | 59.6 |
| Viscosity, Index | 105 | 103 |
| Flash, OC, °F | 465 | 460 |
| Fire, OC, °F | 540 | 535 |
| Pour, °F | +5 | +5 |
| Appearance | bright | bright |
| Color, NPA | 2.75 | 2.75 |
| Carbon Residue, Percent | 0.14 | 0.13 |
| Precipitation No | nil | nil |
| Sulfur, B, Percent | 0.14 | 0.12 |
| Copper Strip Test, 212° F. 3 hr | passes | passes |
| Corrosion Test, ASTM D 665-47 T: | | |
| Distilled Water— | | |
| Steel Rod, Appearance | rusted | bright |
| Area Rusted, Percent | 100 | 0 |
| Synthetic Sea Water: | | |
| Steel Rod, Appearance | rusted | bright |
| Area Rusted, Percent | 100 | 0 |
| Neutralization No | 0.04 | 0.04 |
| Ash, Percent | trace | 0.002 |

Example VII

An improved cup grease was prepared by treating a conventional cup grease with 0.3 per cent by weight of the product prepared according to Example I above. The properties of the untreated cup grease and the cup grease improved with the additive of this invention are illustrated below:

|  | Untreated Grease | Treated Grease |
|---|---|---|
| Sp. Gr., 60°/60° F. | 0.940 | 0.940 |
| Melting Point, ° F., Hawxhurst | 197 | 195 |
| Dropping Point, ° F., ASTM D 566–42 | 220 | 215 |
| Flow Point, ° F., Navy Dept. Specification 14–G–1d | 210 | 212 |
| Consistency, Mm., Braun, 77° F., 2.50 G | 34 | 34 |
| Penetration ASTM D 217–44 T 77° F., 150 G., 5 Sec.: | | |
| Unworked | 319 | 321 |
| Worked | 328 | 335 |
| Water by Dist'n, Percent Wt. | 1.0 | 1.0 |
| Corrosion Test, Method 423, Gulf 5 cc. Syn. Sea Water, 140° F., 12 Days: Steel Strip, Appearance | rusted | bright |

Example VIII

An improved diesel fuel was prepared by treating a diesel fuel (light) with the additive prepared in accordance with Example I above in the ratio of 100 pounds of the additive per 1000 barrels of fuel. The properties of the untreated and treated diesel fuel appear below:

|  | Untreated Diesel Fuel (Light) | Treated Diesel Fuel (Light) |
|---|---|---|
| Gravity, ° API | 42.6 | 42.5 |
| Viscosity, SUV, 100° F | 31.4 | 31.6 |
| Flash, P–M, ° F | 146 | 146 |
| Cloud, ° F | −40 | −40 |
| Pour, ° F | −45 | −45 |
| Color, Saybolt | +19 | +19 |
| Doctor | good | good |
| Odor | normal | normal |
| Sulfur, L, Percent | 0.05 | 0.05 |
| Water and Sediment, Percent | nil | nil |
| Copper Strip Test, 122° F., 3 Hr. | passes | passes |
| Corrosion Test, Method 412, Gulf 4 cc. Water, 36 cc./Oil, 12 Days: | | |
| Steel Strip, Appearance | rusted | bright |
| Area Rusted, Percent | 100 | 0 |

Example IX

An improved turbine lubricating oil was prepared by treating a turbine lubricating oil base with 0.1 per cent by weight of the addition agent prepared according to Example IV above. The properties of the unimproved turbine oil and the improved turbine oil were as follows:

|  | Unimproved Oil | Improved Oil |
|---|---|---|
| Gravity, ° API | 31.7 | 31.7 |
| Viscosity, SUV: | | |
| 100° F | 150.5 | 150.4 |
| 210° F | 43.8 | 43.8 |
| Viscosity Index | 110 | 110 |
| Color, NPA | 1.25 | 1.25 |
| Corrosion Test, ASTM D 665–47 T, Distilled Water: | | |
| Steel Rod, Appearance | rusted | bright |
| Area Rusted, Percent | 100 | 0 |
| Neutralization No | 0.02 | 0.03 |

Example X

An improved turbine lubricating oil was prepared by treating a turbine lubricating oil base with 0.1 per cent by weight of the addition agent prepared according to Example V above. The unimproved and the improved turbine oils had the following properties:

|  | Unimproved Oil | Improved Oil |
|---|---|---|
| Gravity, ° API | 31.7 | 31.3 |
| Viscosity, SUV: | | |
| 100° F | 150.5 | 152.8 |
| 210° F | 43.8 | 43.8 |
| Viscosity Index | 110 | 110 |
| Color, NPA | 1.25 | 1.5 |
| Corrosion Test, ASTM D 665–47 T, Distilled Water: | | |
| Steel Rod, Appearance | rusted | bright |
| Area Rusted, Percent | 100 | 0 |
| Neutralization No | 0.02 | 0.04 |

Example XI

An improved turbine lubricating oil was prepared by treating a turbine lubricating oil base with 0.1 per cent by weight of the addition agent prepared according to Example III above. The properties of the unimproved turbine and the improved turbine oil were as follows:

|  | Unimproved Oil | Improved Oil |
|---|---|---|
| Gravity, ° API | 31.7 | 31.7 |
| Viscosity, SUV: | | |
| 100° F | 150.5 | 150.5 |
| 210° F | 43.8 | 43.8 |
| Viscosity Index | 110 | 110 |
| Color, NPA | 1.25 | 1.25 |
| Corrosion Test, ASTM D 665–47 T, Distilled Water: | | |
| Steel Rod, Appearance | rusted | bright |
| Area Rusted, Percent | 100 | 0 |
| Neutralization No | 0.02 | 0.04 |

A description of the procedure for Gulf Corrosion Test, Method 412, mentioned in Example VIII above, is found in U. S. Patent 2,378,442 to Smith et al., at page 4, column 1, lines 35–53.

Gulf Corrosion Test, Method 423, mentioned in Example VII above, is carried out as follows:

45 g. ±0.1 g. of sample is weighed into a glass receptacle. To this receptacle 5 cc. distilled water, or alternatively, 5 cc. synthetic sea water (3.5% dry weight solution of c. p. sodium chloride in distilled water) are added. The mixture is stirred thoroughly until homogeneous. A metal strip of steel, copper, zinc or other metal, polished bright with Grade No. 1 American steel wool or its equivalent, is immersed in the mixture and coated thoroughly therewith.

The receptacle containing the sample and coated metal strip is placed in an oven maintained at 122° F. ±1° F. The strip is examined for corrosion daily or at other specified intervals.

The foregoing Examples VI–XI, inclusive, clearly show the beneficial properties of our new compounds as rust and corrosion inhibitors. Our new compounds can be used with a large number of compositions to improve the rust inhibiting properties thereof. Thus, in addition to mineral lubricating oils, greases and diesel fuels, our new compounds can be added to gasoline, furnace oils, slushing oils, paints, varnishes, etc. Other uses will be apparent to those skilled in the art.

Resort may be had to such modifications and variations as fall within the spirit of the invention and the scope of the appended claims.

What we claim is:

1. A compound having the formula:

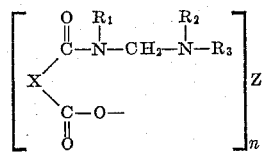

wherein

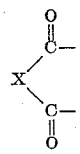

represents an acyl residue of a dicarboxylic acid capable of forming an acid anhydride, $R_1$ and $R_2$ represent radicals selected from the group consisting of aliphatic radicals having at least 8 carbon atoms, cycloalkyl, aryl, alkaryl and aralkyl radicals, $R_3$ is selected from the group consisting of hydrogen and a radical of the group represented by $R_1$ and $R_2$, Z is selected from the group consisting of hydrogen and a salt-forming radical and $n$ is a whole number equal to the valence of Z.

2. The compound of claim 1, wherein

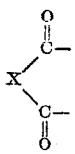

is the acyl residue of phthalic acid.

3. The compound of claim 1, wherein

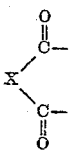

is the acyl residue of maleic acid.

4. An amidic acid having the formula

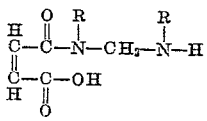

wherein R is lauryl.

5. An amidic acid having the formula

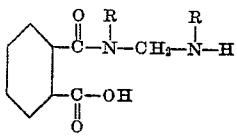

wherein R is lauryl.

6. An amidic acid having the formula:

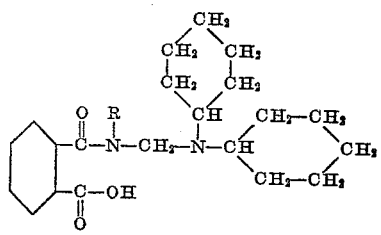

wherein R is lauryl.

7. A salt of an amidic acid having the formula:

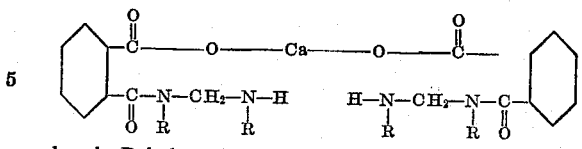

wherein R is lauryl.

8. A monoamide of an N, N'-dialkyl methylene diamine and phthalic acid, where the alkyl substituents are radicals having at least 8 carbon atoms.

9. A monoamide of an N, N'-dialkyl methylene diamine and maleic acid, where the alkyl substituents are radicals having at least 8 carbon atoms.

10. A monoamide of an N, N' - alkyl - dicyclohexyl methylene diamine and phthalic acid, where the alkyl substituent is a radical having at least 8 carbon atoms.

References Cited in the file of this patent

UNITED STATES PATENTS

| | | |
|---|---|---|
| 2,101,323 | Salzberg | Dec. 7, 1937 |
| 2,117,207 | Orthner | May 10, 1938 |
| 2,191,738 | Balle | Feb. 27, 1940 |
| 2,246,264 | Pinkernelle | June 17, 1941 |
| 2,385,911 | Chenicek | Oct. 2, 1945 |
| 2,699,427 | Smith et al. | Jan. 11, 1955 |

OTHER REFERENCES

Passerini: Chem. Abstracts, vol. 18, page 69 (1924).
Ohki: Chem. Abstracts, vol. 44, col. 5867 (1950).